(12) United States Patent
Pollock et al.

(10) Patent No.: US 9,927,323 B2
(45) Date of Patent: Mar. 27, 2018

(54) SYSTEM AND METHOD FOR MONITORING THE STRUCTURAL HEALTH OF COUPLED BEARINGS

(71) Applicant: ACELLENT TECHNOLOGIES, INC., Sunnyvale, CA (US)

(72) Inventors: Patrick Joseph Pollock, Oakland, CA (US); Howard Hungchi Chung, San Jose, CA (US); Roger Huang, Mountain View, CA (US); Fu-Kuo Chang, Stanford, CA (US); Irene Li, Stanford, CA (US); Jeffrey Dean Bergman, Santa Clara, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 617 days.

(21) Appl. No.: 14/064,019

(22) Filed: Oct. 25, 2013

(65) Prior Publication Data
US 2014/0116142 A1    May 1, 2014

Related U.S. Application Data

(60) Provisional application No. 61/719,332, filed on Oct. 26, 2012, provisional application No. 61/719,339, filed on Oct. 26, 2012.

(51) Int. Cl.
*G01M 13/04*    (2006.01)

(52) U.S. Cl.
CPC ............................ *G01M 13/045* (2013.01)

(58) Field of Classification Search
CPC ....................................................... G01M 3/045
USPC ............................................................. 73/593
See application file for complete search history.

(56) References Cited

U.S. PATENT DOCUMENTS

| | | | | | |
|---|---|---|---|---|---|
| 4,237,545 | A | * | 12/1980 | Deglin | H04Q 3/54 712/245 |
| 4,481,819 | A | * | 11/1984 | Yoneyama | G01N 29/14 73/593 |
| 4,672,850 | A | * | 6/1987 | Konersmann | G01H 1/003 73/593 |
| 5,677,488 | A | * | 10/1997 | Monahan | F16C 19/30 340/682 |
| 5,778,779 | A | * | 7/1998 | Jones | B41F 7/10 101/216 |
| 6,677,539 | B2 | * | 1/2004 | Miura | G01L 1/2206 177/136 |

(Continued)

*Primary Examiner* — Hezron E Williams
*Assistant Examiner* — Tarun Sinha
(74) *Attorney, Agent, or Firm* — Innovation Counsel LLP (57) ABSTRACT

Placement of structural health monitoring sensors within a coupled bearing assembly. An exemplary structural health monitoring system comprises first and second bearings configured for rotatable positioning along a structure, and a spacer positioned between the first and second bearings. The first and second bearings are placed against opposing sides of the spacer, and have a preload force engaging the respective first and second bearings against the opposing sides of the spacer. A plurality of sensors are coupled to the spacer so as to be positioned between the spacer and at least one of the first and second bearings, the sensors further coupled to at least one of the first and second bearings so as to be configured to monitor a structural health of the at least one of the first and second bearings.

18 Claims, 4 Drawing Sheets

(56) References Cited

U.S. PATENT DOCUMENTS

| | | | |
|---|---|---|---|
| 2002/0076127 A1* | 6/2002 | Wu | F16C 25/08 384/517 |
| 2007/0056375 A1* | 3/2007 | Akdeniz | G01L 5/243 73/649 |
| 2013/0048688 A1* | 2/2013 | Mulder | A01M 7/0085 224/410 |

* cited by examiner

SYSTEM AND METHOD FOR MONITORING THE STRUCTURAL HEALTH OF COUPLED BEARINGS

This application claims priority to, and the benefit of, U.S. Provisional Application Nos. 61/719,332 and 61/719,339, each filed on Oct. 26, 2012, the entire contents of which are hereby incorporated by reference.

BRIEF DESCRIPTION

This invention relates generally to structural health monitoring (SHM). More specifically, this invention relates to systems and methods for monitoring the structural health of coupled bearings.

BACKGROUND

Coupled bearing elements have historically posed challenges to structural health monitoring systems. As the individual bearings are compressed together with a preload force, the space between the bearings forms a challenging environment for SHM sensors. Little to no room exists for sensors to be placed between bearings, and any sensors placed there must be able to withstand the preload, and other, forces.

SUMMARY

The invention can be implemented in a number of ways, such as by a structural health monitoring system.

In one embodiment, a structural health monitoring system comprises first and second bearings configured for rotatable positioning along a structure, and a spacer positioned between the first and second bearings. The first and second bearings are placed against opposing sides of the spacer and have a preload force engaging the respective first and second bearings against the opposing sides of the spacer. A plurality of sensors is coupled to the spacer so as to be positioned between the spacer and at least one of the first and second bearings, the sensors further coupled to at least one of the first and second bearings so as to be configured to monitor a structural health of the at least one of the first and second bearings.

The sensors may be coupled to the at least one of the first and second bearings so as to be able to generate stress waves in, and receive stress waves from, the at least one of the first and second bearings.

The sensors may be affixed to a side of the spacer so as to be positioned between the first and second bearings.

The sensors may be positioned within one or more depressions in the spacer.

The side of the spacer may be substantially planar, so that the sensors protrude from the side of the spacer toward at the least one of the first and second bearings.

The sensors may contact the at least one of the first and second bearings.

The sensors may be embedded within the spacer.

The spacer may comprise a laminated composite material having a plurality of layers, wherein the sensors are embedded between the layers of at least one pair of the layers.

The sensors may comprise piezoelectric polymer layers.

The sensors may be coupled to the at least one of the first and second bearings so as to be able to measure a magnitude of the preload force.

In another embodiment, a structural health monitoring system comprises first and second bearings coupled to each other at least partially by a preload force, and a plurality of sensors affixed to at least one of the first and second bearings. The sensors are positioned between the first and second bearings so as to be configured to monitor a structural health of at least one of the bearings.

The sensors may be coupled to the at least one of the first and second bearings so as to be able to generate stress waves in, and receive stress waves from, the at least one of the first and second bearings.

This embodiment may further comprise a spacer positioned between the first and second bearings, so that the sensors are positioned between the spacer and at least one of the first and second bearings. The sensors may contact the spacer.

The sensors may be coupled to the at least one of the first and second bearings so as to be able to measure a magnitude of the preload force.

The sensors may be positioned within one or more depressions in the at least one of the first and second bearings.

The sensors may be affixed to one or more sides of the at least one of the first and second bearings, wherein each side of the one or more sides is substantially planar, so that the sensors protrude from the each side.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings. The various Figures are not necessarily to scale.

DETAILED DESCRIPTION OF EMBODIMENTS OF THE INVENTION

In one embodiment, the invention relates to the structural health monitoring of coupled bearings. A number of sensors are placed in-between a pair of bearings that have a compressive preload force applied—a location that is difficult to monitor by conventional means. The sensors can thus measure the preload force, as well as the structural health of the bearings, during bearing operation. This reduces bearing downtime, in addition to allowing for real-time monitoring of bearing health during operation.

Figure 3:
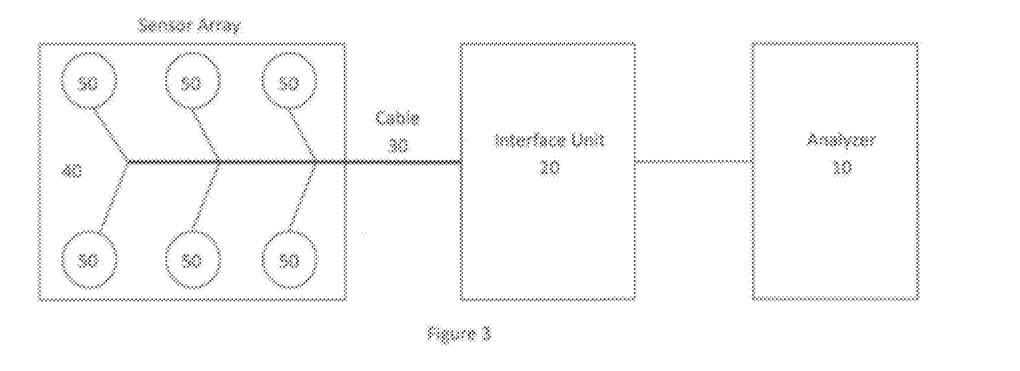
FIG. 3 is a block diagram representation of a system for monitoring coupled bearing elements, according to embodiments of the present invention.

A system is provided for conducting structural health monitoring of bearings, and in particular, coupled bearing assemblies. FIG. 3 is a block diagram representation of an embodiment of an exemplary such system, which includes an analyzer 10, interface unit 20, cable 30, and sensor array 40. The sensor array 40 can be a flexible substrate that contains any number of sensors 50, and may or may not be present. That is, the sensors 50 may be present by themselves, or they may be incorporated into an additional flexible substrate.

Figure 1:
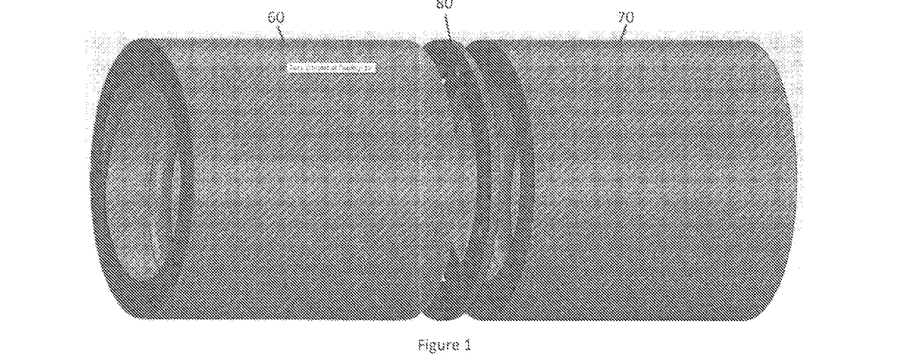
FIG. 1 is an exploded view of a coupled bearing assembly in accordance with embodiments of the present invention.
Figure 2:
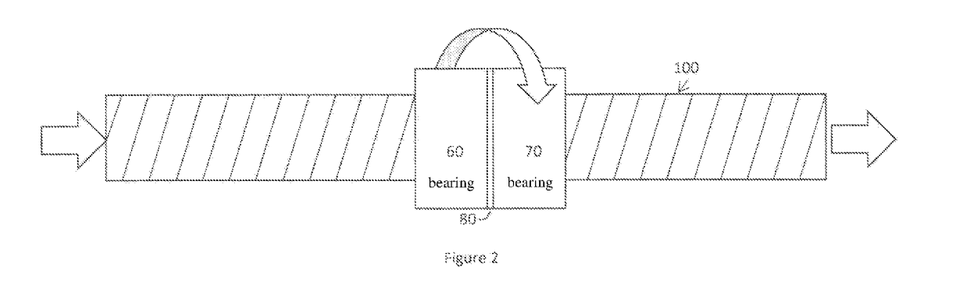
FIG. 2 illustrates operation of coupled bearings of embodiments of the present invention.

FIG. 1 is an exploded view of a coupled bearing assembly in accordance with embodiments of the present invention, and FIG. 2 illustrates operation of this coupled bearing assembly. Here, two bearings 60 and 70 are placed along a screw shaft 100. In typical such cases, the bearings 60, 70 contain ball bearings placed along their threaded groove, and these ball bearings sit in corresponding threads of the screw shaft to allow for actuation when the shaft is turned. The bearings 60, 70 are typically preloaded against each other, i.e. a compressive preload force pressing the bearings 60, 70 against each other is maintained, with a spacer 80 positioned in-between the two and also being in compression.

The sensor array 40 (or simply the individual sensors 50) is placed on the spacer 80 and faces one or both of the bearings 60, 70 so as to be pressed against the bearings 60, 70 and to thereby be placed in communication with the bearings 60, 70. In this manner, the sensors 50 can transmit stress waves through their respective bearings 60, 70 and also receive stress waves from them.

The sensors 50 can be any sensors capable of conducting structural health monitoring analysis, but in one example can be known piezoelectric sensors capable of both propagating ultrasonic guided waves in the structure to which they are attached for active querying thereof, as well as sensing stress waves in the part or structure. In another example, the sensors 50 can include polyvinylidene fluoride (PVDF) sensors, constructed from a piezoelectric PVDF polymer layer. The sensors 50 can also include other types of sensors that are capable of detecting static pressure, such as that applied by the above referenced preload force.

The sensors send/receive signals to/from analyzer 10 for analysis, via the interface unit 20. The analyzer 10 can include both power transmission capability for actuating sensors 50 during active querying, as well as analysis capability for analyzing sensed signals from the sensors 50 to determine the health of the bearings. The interface unit 20 can be any unit that provides or facilitates electrical or electronic communication between the sensors 50 and analyzer 10. As one example, the interface unit 20 can be a wireless transceiver unit affixed to one or more of the bearings 60, 70, and spacer 80. The transceiver unit can have a known analog to digital converter (ADC, not shown) for converting the analog electrical signals generated by the sensors 50 to digital signals, and broadcasting these digital signals (perhaps after filtering by one or more known signal filters, also not shown) wirelessly to analyzer 10. In this manner, the bearings 60, 70 can undergo rotational and translational motion without the need for wires or any other physical connection to the analyzer 10. Similarly, the analyzer 10 can transmit digital waveforms to the transceiver unit, whereupon the interface unit 20 converts them to analog signals via a known digital to analog converter (DAC, not shown), amplifies the analog signals via a known power source (not shown), and transmits the amplified signals to the sensors 50. The sensors 50 then generate corresponding stress waves in the bearings 60, 70 and/or spacer 80.

As another example, the interface unit 20 can be a ringlike coupling placed on the shaft 100. The ringlike coupling has an inner housing that is affixed to and rotates with the shaft 100, as well as an outer housing that is electrically coupled to the inner housing but is free to rotate with respect to the inner housing. Brushes extend from the inner housing to contact the outer housing, providing electrical connections between the sensors 50 and electrical terminals on the outer housing. This ringlike coupling is described in further detail below. It should be noted, however, that both this ringlike coupling and the abovementioned wireless transceiver are but two mechanisms for implementing electronic communication between the sensors 50 and analyzer 10, and any other mechanism providing for such electronic communication is also contemplated. For example, the sensors 50 can simply be directly connected to the analyzer 10 via a plurality of wires, although in some applications these wires may undesirably interfere with rotation of the bearings 60, 70.

The sensors 50 can each be separately bonded to the spacer 80. Alternatively, the sensors 50 can be integrated into a flexible dielectric layer (represented by sensor array 40 in FIG. 3), so that only a single layer need be bonded to the rotating element. Such layers and their arrays of sensors 50 are known, and are further described in, for example, U.S. Pat. Nos. 7,413,919 and 6,370,964 which are both hereby incorporated by reference in their entireties.

The sensors 50 may be bonded to either of the surfaces of spacer 80 that face bearings 60 and 70. That is, the spacer 80 may have surfaces facing bearings 60, 70 (in FIG. 1, the leftmost and rightmost surfaces of the spacer 80) that are substantially planar surfaces as shown in FIG. 1, where the sensors 50 or their sensor array 40 are bonded to either one or both of these surfaces.

The leftmost and rightmost surfaces of the spacer 80 of FIG. 1 may also have one or more depressions machined in them (see, e.g., the lighter-colored circular areas of spacer 80 in FIG. 1), where each depression is sized to fit one or more sensors 50. The sensors 50 can be bonded to the spacer 80 within these depressions. The depressions are machined to a depth that is less than or equal to the height of a sensor 50, so that the top of each sensor 50 is coplanar with the upper surface of the spacer 80 or extends slightly above the upper surface (so as to be placed in slight compression by the bearings 60, 70 when they are preloaded together with the spacer 80 in-between). This allows the sensors 50 to contact the bearing 60, 70 that it faces, so that it may generate and/or detect stress waves within that bearing 60, 70.

Alternatively, the sensors 50 can be incorporated directly into the spacer 80, such as by fabricating a composite or laminated spacer 80 having sensors 50 incorporated into the composite or laminate layers. More specifically, the spacer 80 can be fabricated as a composite laminate spacer in known fashion, with a number of layers adhered to each other within a matrix, where the sensors 50 are placed between layers so as to be affixed within the body of spacer 80. In this case, wires 30 would extend from each of the sensors 50 to the exterior of the spacer 80 to be connected to interface unit 20.

Still further, the sensors 50 can be affixed to one or more sides of the bearings 60, 70 that face the spacer 80, rather than being affixed to the spacer 80. In particular, the sensors 50 can be bonded or otherwise affixed to one or more of the planar surfaces of bearings 60, 70 which face spacer 80 in FIG. 1. In this manner, the sensors 50 are placed in contact with a surface of the spacer 80 when the bearings 60, 70 are preloaded against the spacer 80. Alternatively, pockets or depressions can be machined in the surfaces of bearings 60, 70 which face the spacer 80, and the sensors 50 can be placed in the pockets. In this case, the sensors 50 would protrude from the upper surface of the pocket slightly so as to contact the spacer 80 or the opposite bearing 60, 70 (if the spacer 80 is removed and the bearings 60, 70 are preloaded against each other), so that the sensors 50 are capable of generating/detecting stress waves in the spacer 80 or opposite bearing 60, 70.

In this manner, embodiments of the invention allow for a network of structural health monitoring sensors 50 to be directly coupled to a bearing within its bearing assembly, so that the sensors 50 can monitor the structural health of the bearing assembly during its operation and in real time. In particular, the system can monitor the preload force applied between the bearings 60, 70 to determine any weakening in preload over time, and can also measure acoustic signals generated by the ball bearings during their operation, which as is known can indicate characteristics of wear in the ball bearings.

The sensors 50 and analyzer 10 can also be configured to conduct any other type of structural health monitoring. For example, the sensors 50 can query the structure (or passively detect stress waves generated during operation of the rotating part) for detection of fatigue cracks, corrosion, plastic deformation in metallic parts and delaminations, disbonds, and cracking in composite part, and/or any other quantities of interest in structural health monitoring.

In operation, the sensor array 40 can be affixed to the spacer 80 so that the sensors 50 face one of the bearings 60, 70. When the bearings are preloaded against one another, the sensors 50 are pressed against one of the bearings 60, 70, and can thus monitor that bearing 60, 70 for various structural health quantities. In particular, the sensors 50 can actively query the bearings 60, 70 by transmitting stress waves therethrough, and/or can passively monitor the bearings 60, 70 for acoustic waves generated by the bearings 60, 70, or any other quantities. If the sensors 50 are simply attached to a surface of the spacer 80 facing the bearings 60, 70, the sensors 50 may be configured as PVDF sensors that can withstand the compressive forces of the bearing preload and still operate as described herein.

In another embodiment, the system uses piezoelectric discs to propagate ultrasonic guided waves in the bearing assembly. The piezoelectric discs can serve as actuators and sensors. The piezoelectric discs can be embedded in a flexible polyimide film which also contains the wiring for every disc. The polyimide film containing the piezoelectric discs is bonded to one or more of the spacer 80 and bearings 60, 70. The wiring in the polyimide film is routed to a central area for a simple connection to the interface unit 20.

It is desirable to maintain the correct pre-load in the bearing during operation. As the bearing is used during operation, heat may cause expansion which increases pre-load. As the bearings inside the ball screw begin to wear, the pre-load decreases. If the pre-load of the bearing could be continuously monitored, more optimal operating conditions could be implemented. Thus, in other embodiments, the sensors 50 can include force sensors (known and including, but not limited to, the otherwise installed and utilized piezoelectric sensors) to provide continuous feedback about the operating conditions of the ball screw. Force sensors would be used to monitor the pre-load, while the piezoelectric or PVDF sensor would monitor the ball screw damage. The piezoelectric or PVDF elements would be able to actuate or sense ultrasonic waves enabling damage detection. In this manner, the system would be able to detect fatigue cracks, corrosion, plastic deformation, and/or other structural health quantities, while the force sensors would be used to track the pre-load during operation and alert the operator if a preload adjustment is needed. The systems of the invention can include arrays of sensors 50 that include any combination of force sensors, piezoelectric sensors, and any other sensors as appropriate.

Ringlike Coupling

As described above, one nonlimiting exemplary embodiment of the interface unit 20 can be a ringlike coupling with an inner housing that is affixed to and rotates with the shaft 100, as well as an outer housing that is electrically coupled to the inner housing but is free to rotate with respect to the inner housing.

In this embodiment, interface unit 20 is configured to be coupled to the rotating part (i.e. shaft 100), along with sensor array 40, so that sensor array 40, cable 30, and at least a portion of interface unit 20 each rotate with the rotating part. In one embodiment, the interface unit 20 can be a slip ring with a stationary outer housing and an inner housing rotationally coupled to the outer housing. The inner housing is attached to the rotating part and spins with the part, while the outer housing is fixed (or at least does not move exactly along with the inner housing) and contains electrical and electronic connections for communication with analyzer 10. More specifically, the inner housing can contain a number of interfaces to each of the sensors 50, so that the cable 30 maintains individual connections between each sensor 50 at one end, and a corresponding interface at the other end. The interfaces are each electrically connected to a separate conductive brush, which is in turn positioned to contact a conductive ring in the outer housing. Each ring is positioned so that as its brush spins, it continuously contacts the ring, thus maintaining an electrical contact between a particular sensor 50 and the ring. Each ring is in turn electrically connected to one of the electrical connections in the outer housing, i.e. is connected to the analyzer 10. In this manner, each sensor 50 has its own separate electrical connection to analyzer 10, through the interface unit 20. Further, each electrical connection is insulated from the remaining electrical connections, so that each sensor 50 can be individually controlled by the analyzer 10.

Figure 4:
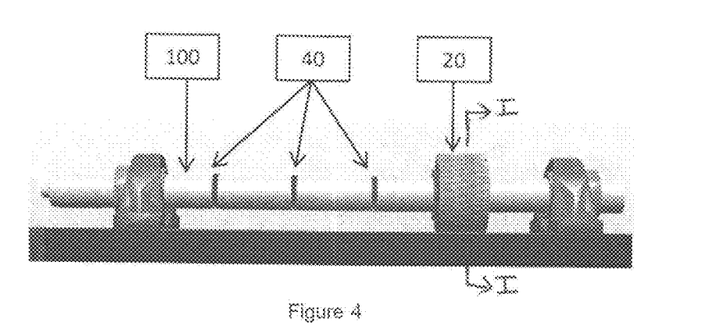
FIGS. 4 and 5 conceptually illustrate the configuration of one embodiment of the electrical interface unit of FIG. 3, implemented on a rotating shaft.
Figure 5:
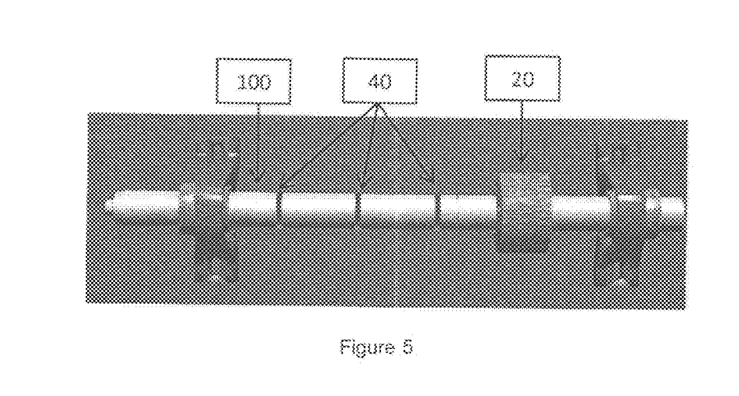

FIGS. 4 and 5 conceptually illustrate the configuration of this embodiment, implemented on a rotating shaft. The sensor array 40, shown as being incorporated into or onto a flexible layer shaped for affixing to the shaft 100, is bonded to the shaft 100. The interface unit 20 is shown as a slip ring whose inner housing is attached to the shaft 100.

Figure 8:
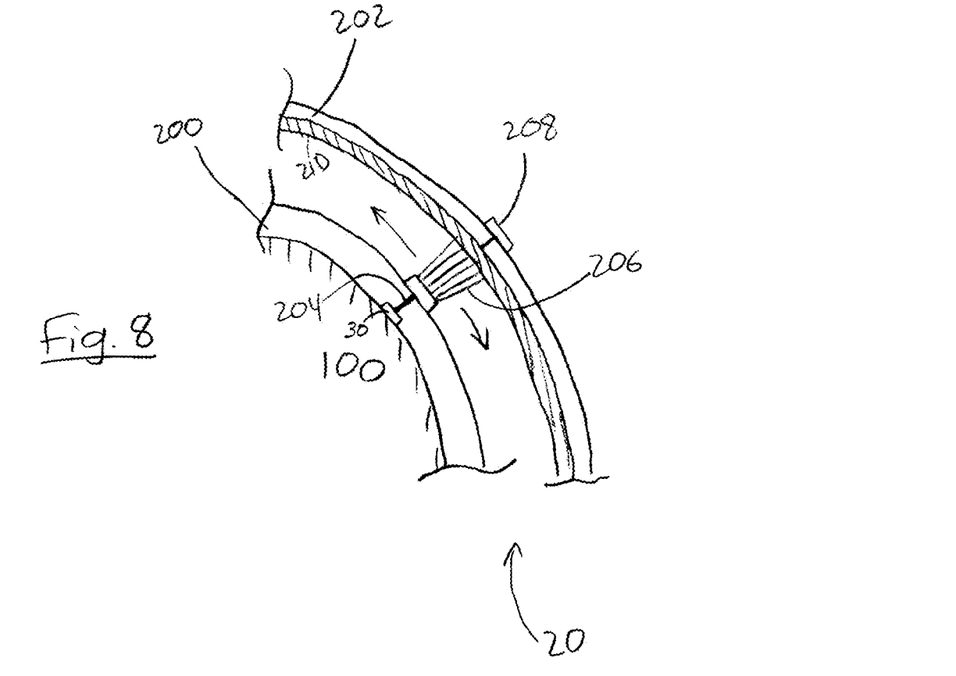
FIG. 8 illustrates a cross-section of an electrical interface unit, that is taken along section I-I of FIG. 4.
Figure 9:
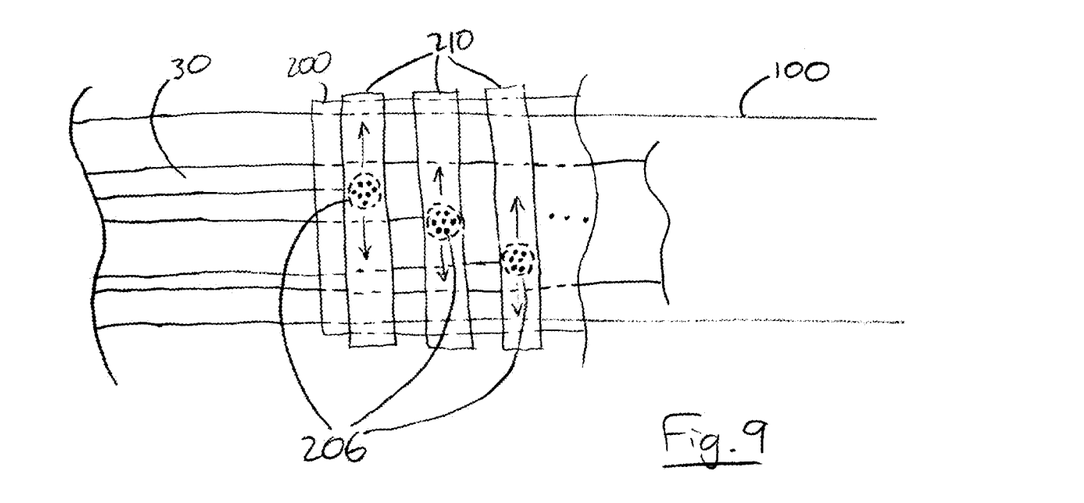
FIG. 9 illustrates a plan view of the inner ring and portions of the outer ring of the electrical interface unit of FIG. 4.

FIGS. 8 and 9 illustrate further details of interface unit 20. FIG. 8 is a cross-sectional view of interface unit 20, and FIG. 9 is a plan view of the inner ring thereof, as well as a portion of the outer ring. More specifically, the slip ring or interface unit 20 has an inner ring 200 and outer ring 202. The inner ring 202 is attached to shaft 100, and rotates therewith. The outer ring 202 is positioned radially outward from the inner ring 200, and is free to rotate independent of inner ring 200, or can be affixed so that it does not rotate. Each of the inner ring 200 and outer ring 202 can be made of any suitable material. For example, each can be made of a steel or other metal that is compatible with the material of the shaft 100.

The inner ring 200 has a number of conductive brushes 206 extending radially outward therefrom, where each brush 206 is connected by cable 30 and wiring 204 to one particular sensor 50. The conductive brush 206 has a number of conductive bristles made of a metal or other conductor, and extends radially outward to contact a conductive collar 210 bonded to outer ring 202. The conductive collar 210 is bonded to the outer ring 202 with an insulating adhesive, or alternatively can have an insulating layer (not shown) placed between itself and the outer ring 202 (or, the outer ring 202 can simply be made of an insulating material). Each conductive collar 210 is electrically connected to a separate terminal 208 on the exterior of outer ring 202, as shown. Leads from analyzer 10 can then be connected to each terminal 208 to transmit/receive electrical signals to/from each sensor 50.

As can be seen from FIG. 9, each sensor 50 is connected to a separate conductive brush 206 which in turn contacts, and is thus electrically connected to, one of the conductive collars 210 of outer ring 202. Thus, a continuous electrical pathway is maintained between each sensor 50 and its associated terminal 208. As the shaft 100 rotates about its major axis (and hence each sensor 50 rotates about the same axis), each brush 206 rotates in the same manner, its bristles frictionally contacting its respective collar 210 and thus maintaining electrical contact therewith. In FIG. 9, note that the collars 210 are connected to, and may be considered part of, outer ring 202.

Embodiments of the invention are not limited to those shown. For example, while the conductive brushes 206 are shown as attached to the inner ring 200, one of ordinary skill in the art will observe that the brushes 206 can instead be attached to the outer ring 202, so that their bristles frictionally contact the inner ring 200. In such a configuration, the inner ring 200 can have a number of collars that are insulated from each other, where each brush 206 contacts one of these collars. Each collar is then placed in electrical contact with one of the sensors 50.

Figure 6:
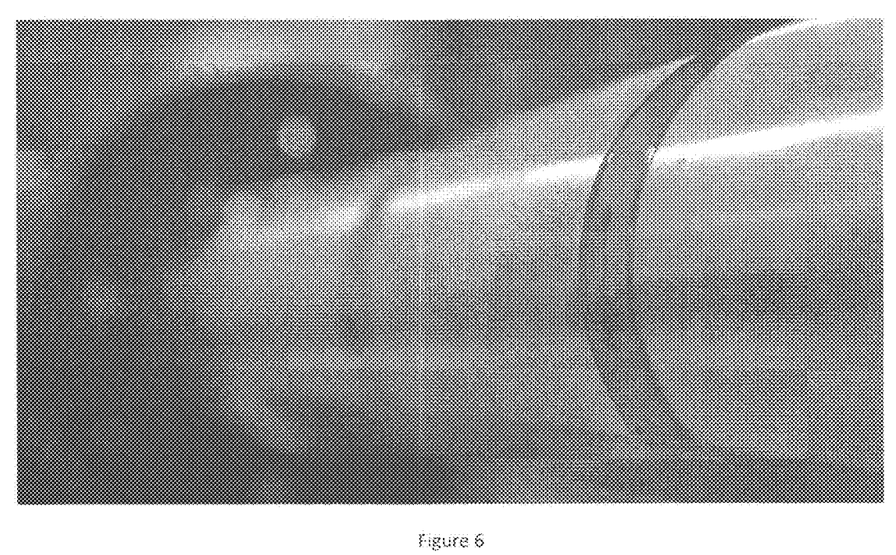
FIGS. 6 and 7 are pictures of an actual implementation of one system exemplifying an embodiment of the invention.
Figure 7:
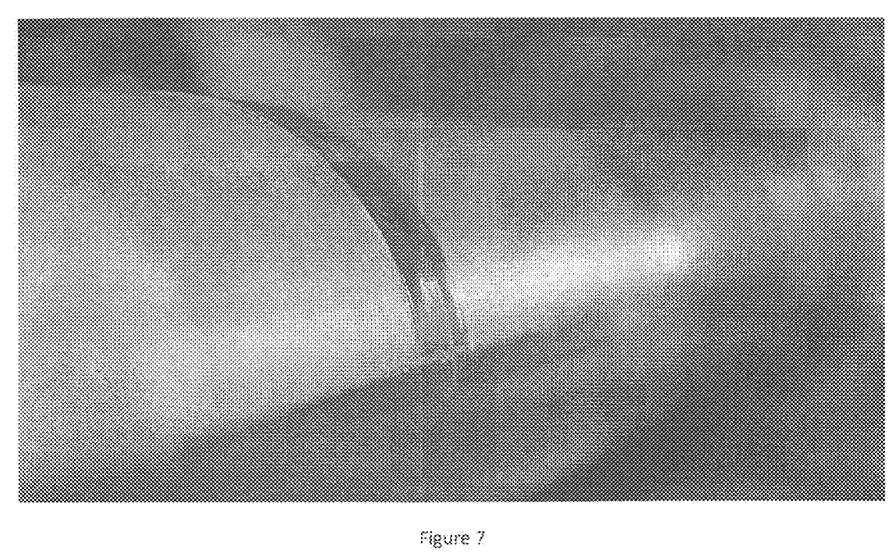

FIGS. 6 and 7 are pictures of an actual implementation of one system exemplifying an embodiment of the invention. Shown is a metallic shaft that rotates, with a PCB-like flexible sensor array layer bonded to the shaft. The flexible layer contains a number of piezoelectric sensors that are thereby placed in communication with the shaft. The slip ring can be seen in the background of FIG. 6, and the sensor layer extends into the slip ring, for electrical contact to the connections maintained in its inner housing.

The forgoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the sensors 50 can be arranged in any configuration and number on the bearings, with each of the sensors 50 facing one bearing 60, 70 or some facing one bearing 60, 70 and others facing the other bearing 70, 60. Also, the sensors 50 can be incorporated into a dielectric layer or individually placed. The sensors 50 can be PVDF sensors, piezoelectric ceramic sensors, or any other type of sensors, and can be affixed to a surface of the bearing or spacer, in depressions machined therein, or can be incorporated into the structure of the bearings and/or spacer. Also, the various embodiments each have certain features that differ from those of other embodiments, and it is noted that the invention contemplates the mixing and matching of various features as desired. That is, further embodiments can be formed from the selection of various features from different embodiments. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A structural health monitoring system, comprising:
   first and second bearings configured for rotatable positioning along a structure;
   a spacer positioned between the first and second bearings, the first and second bearings placed against opposing sides of the spacer and having a preload force engaging the respective first and second bearings against the opposing sides of the spacer; and
   a plurality of sensors coupled to the spacer so as to be positioned at an outer surface of the spacer and facing one of the first and second bearings, the sensors directly contacting at least one of the first and second bearings so as to be configured to monitor a structural health of the at least one of the first and second bearings.

2. The structural health monitoring system of claim 1, wherein the sensors are coupled to the at least one of the first and second bearings so as to be able to generate stress waves in, and receive stress waves from, the at least one of the first and second bearings.

3. The structural health monitoring system of claim 2, wherein the sensors are affixed to a side of the spacer so as to be positioned between the first and second bearings.

4. The structural health monitoring system of claim 3, wherein the sensors are positioned within one or more depressions in the spacer.

5. The structural health monitoring system of claim 3, wherein the side of the spacer is substantially planar, so that the sensors protrude from the side of the spacer toward at the least one of the first and second bearings.

6. The structural health monitoring system of claim 2, wherein the sensors contact the at least one of the first and second bearings.

7. The structural health monitoring system of claim 2, wherein the sensors are embedded within the spacer.

8. The structural health monitoring system of claim 7, wherein the spacer comprises a laminated composite material having a plurality of layers, and wherein the sensors are embedded between the layers of at least one pair of the layers.

9. The structural health monitoring system of claim 1, wherein the sensors comprise piezoelectric polymer layers.

10. The structural health monitoring system of claim 1, wherein the sensors are coupled to the at least one of the first and second bearings so as to be able to measure a magnitude of the preload force.

11. A structural health monitoring system, comprising:
    first and second bearings coupled to each other at least partially by a preload force; and
    a plurality of sensors affixed to at least one of the first and second bearings, the sensors positioned between the first and second bearings so as to be configured to monitor a structural health of at least one of the bearings.

12. The structural health monitoring system of claim 1, wherein the sensors are coupled to the at least one of the first and second bearings so as to be able to generate stress waves in, and receive stress waves from, the at least one of the first and second bearings.

13. The structural health monitoring system of claim 11, further comprising a spacer positioned between the first and second bearings, so that the sensors are positioned between the spacer and at least one of the first and second bearings.

14. The structural health monitoring system of claim 13, wherein the sensors contact the spacer.

15. The structural health monitoring system of claim 11, wherein the sensors comprise piezoelectric polymer layers.

16. The structural health monitoring system of claim 11, wherein the sensors are coupled to the at least one of the first and second bearings so as to be able to measure a magnitude of the preload force.

17. The structural health monitoring system of claim 11, wherein the sensors are positioned within one or more depressions in the at least one of the first and second bearings.

18. The structural health monitoring system of claim 11, wherein the sensors are affixed to one or more sides of the at least one of the first and second bearings, and wherein each side of the one or more sides is substantially planar, so that the sensors protrude from the each side.

* * * * *